Jan. 27, 1942. W. W. KANTACK Re. 22,014

LIGHTING FIXTURE

Original Filed March 5, 1935 3 Sheets-Sheet 1

INVENTOR
WALTER W. KANTACK
BY Gustav Drews
ATTORNEY

Jan. 27, 1942. W. W. KANTACK Re. 22,014

LIGHTING FIXTURE

Original Filed March 5, 1935 3 Sheets-Sheet 2

INVENTOR
WALTER W. KANTACK
BY Gustav Drews
ATTORNEY

Jan. 27, 1942. W. W. KANTACK Re. 22,014

LIGHTING FIXTURE

Original Filed March 5, 1935 3 Sheets-Sheet 3

INVENTOR
WALTER W. KANTACK
BY Gustav Drews
ATTORNEY

Reissued Jan. 27, 1942

Re. 22,014

UNITED STATES PATENT OFFICE 22,014

LIGHTING FIXTURE

Walter W. Kantack, St. Albans, N. Y.

Original No. 2,075,206, dated March 30, 1937, Serial No. 9,356, March 5, 1935. Application for reissue July 8, 1938, Serial No. 218,255

15 Claims. (Cl. 240—78)

This invention relates to lighting fixtures in general and more especially to lighting fixtures including means for producing indirect light rays.

Among the objects of the present invention, it is aimed to provide an improved lighting fixture which will not only serve to house the main source of light for a room or the like but will in addition cooperate with the source of light to produce a decorative ornament.

Specifically it is an object of the present invention to provide an improved lighting fixture which will not only serve to house a source of light for a given area or space but also cooperate with the source of light to illuminate the outer decorative face of the light fixture to constitute an illuminated decorative ornament.

It is still another object of the present invention to provide improved connecting devices for connecting the shells and rims of lighting fixtures made according to the present invention to a support, such as a socket cover or the like.

It is still another object of the present invention to provide an improved lighting fixture including a decorative ornament and a concealed source of light for illuminating such ornament.

These and other features, capabilities and advantages of the invention will appear from the subjoined detail description of specific embodiments thereof illustrated in the accompanying drawings in which Figure 1 is a side elevation of a lighting fixture made according to one embodiment of the present invention partly in section;

Fig. 4 is an enlarged fragmental section showing one of the connecting devices in final connecting position;

Fig. 5 is an enlarged perspective of one of the connecting blocks removed from the fixture;

Figure 1:
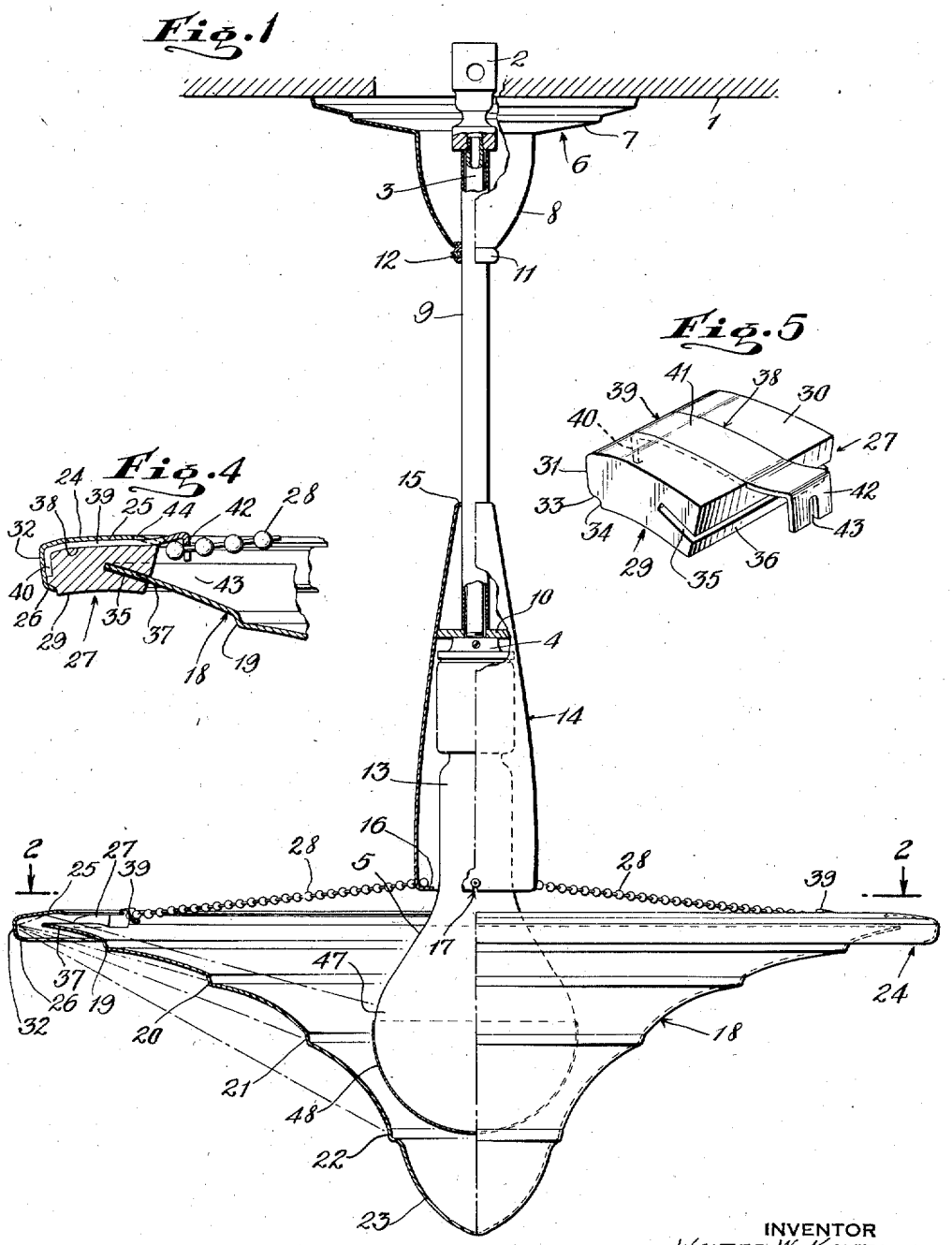

In the embodiment illustrated in Figs. 1 to 5 inclusive, the embodiment of the lighting fixture shown is associated with a ceiling 1 through which extends the swivel hickey 2 connected to an outlet box or the like. To the lower end of the hickey 2, there is connected a conduit 3 which is connected at its lower end to the lamp socket 4.

In the lamp socket 4 in the present instance, there is shown secured a lamp 5 which in the present instance is illustrative of the two hundred watt lamps extensively used.

To cover the hickey 2, conduit 3, lamp socket 4 and neck of the lamp 5 in the present instance, there is provided a covering having the canopy 6 consisting of the outwardly flaring hollow base portion 7, the upper outer edge of which engages the face of the ceiling 1 and from the inner lower end of which there extends the thimble portion 8 through which extends the conduit 9. The length of the conduit 9 is preferably predetermined to correspond to the distance between the lower edge of the hickey 2 and the disc 10 disposed at the upper end of the socket 4 and in which case the socket 4 supports the disc 10 and the disc 10 in turn supports the conduit 9 in position on the conduit 3.

The canopy 6 in turn is positioned against the ceiling 1 by the ring 11 mounted on the conduit 9 due to the set screw 12 extending through the ring 11 and frictionally pressed against the conduit 9. From the conduit 9 downwardly around the disc 10, socket 4 and neck 13 of the lamp 5, there extends the socket cover 14, the lower end of which is preferably wider than the upper end as indicated with an inwardly extending flange 15 at the upper end engaging the outer face of the conduit 9 and an inwardly extending flange 16 at the lower end. The lower end of the cover 14 is preferably provided with three small slots 17 which are cut through the flange 16 and up into the outer wall of the cover 14 as shown in Fig. 1.

The main portion of the present invention will now be described. It consists essentially of the shell 18 having a plurality of beads or annular steps, four being shown in the present instance to wit, 19, 20, 21 and 22. These steps 19 to 22 inclusive are preferably formed as shown in an inwardly curved surface of the shell 18. The lower end of the shell 18 in the present instance terminates in a helmet shaped inverted dome portion 23.

Along the upper outer edge of the shell 18, there is mounted an annular rim 24 which is shown as provided with an upper wide inwardly extending flange 25 and a lower narrow inwardly extending flange 26, the flange 25 preferably extending above and inwardly of the outer edge of the shell 18 and the end of the flange 26 preferably terminating below and outwardly of the outer edge of the shell 18. The rim 24 and shell 18 are preferably connected to the socket cover 14. In the present instance they are connected by three sets of connecting devices 27 and ball chains 28. Each connecting device consists essentially of a block 29 composed preferably of a translucent plastic material which is preferably provided with an upper face 30 conforming to the inner face of the flange 25, and outer face 31 conforming to the intervening portion 32 of the rim 24 and a lower face 33 conforming to the inner face of the flange 26, the shoulder 34 preferably being disposed in alinement with the inner edge of the flange 26.

Each of the blocks 29 in addition is provided with a slot 35 extending from its inner face 36 in an upwardly inclined direction and conforming in thickness and shape to the outer end portion 37 of the shell 18. The block 29 is also preferably provided with a recess 38 extending along a portion of the outer end of the block 29 and the full width of the upper portion of the block 29, see Fig. 5, to receive the metal clip 39 having an outer portion 40, a main shank portion 41 and a front downwardly extending portion 42 provided with a recess 43. The finger 42 is preferably inclined to form a right angle or less with the line of pull of the ball chain 28.

A ball chain 28 as shown in Fig. 1 is connected to the finger 42 and lower edge of the cover 14 in the well known manner by having it pressed into the recess 43 and recess 17 as shown.

Figure 2:
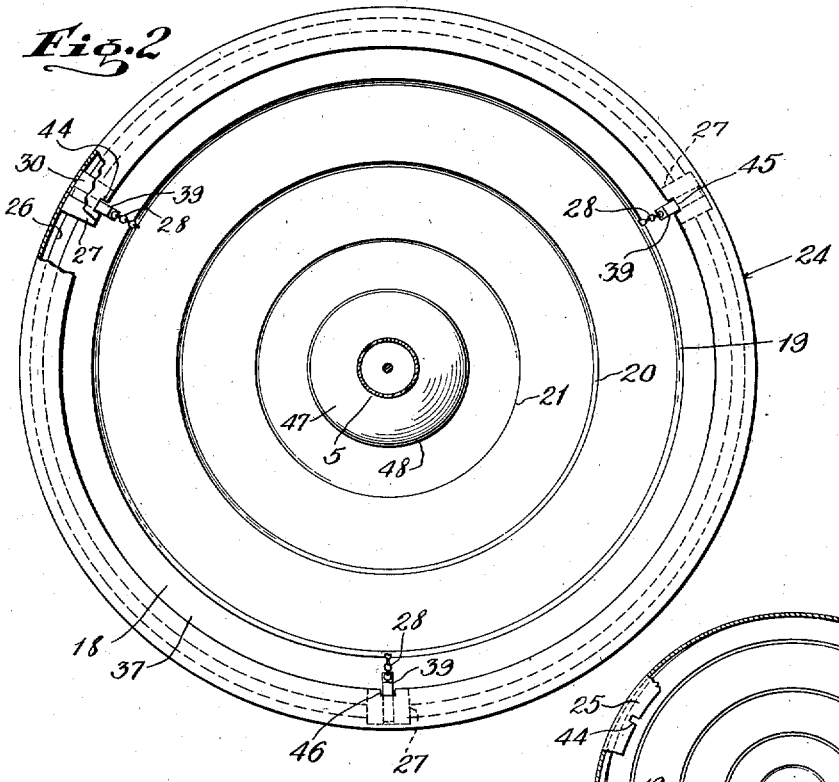
Fig. 2 is a section on the line 2—2 of Fig. 1 with a part broken away to show a connecting device associated with the fixture.
Figure 3:
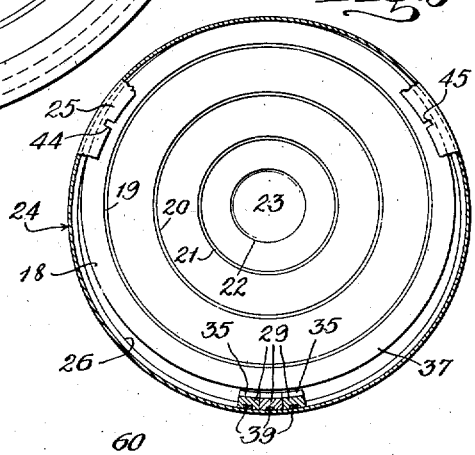
Fig. 3 is a view similar to that shown in Fig. 2 on a smaller scale with the connecting devices grouped together before being disposed in their final connecting position.

The upper flange of the rim 24, see particularly Figs. 2 and 3 is preferably provided with three recesses 44, 45 and 46 conforming in width to the width of the shank portions 41 of the metallic clips 39. In order to connect the connecting devices 27 and ball chains 28 in place, the ball chains are first connected to the connecting devices 27 and to the lower end of the socket cover 14, then the rim 24 is slipped up adjacent the cover 14 and then the outer edge portion 37 of the shell 18 inserted into the recesses 35 of the blocks 29 grouped together as shown in Fig. 3. The annular rim 24 is thereupon pulled down over the blocks 29 and the edge of the shell 18 and thereupon the blocks 29 separated until each register with one of the recesses 44, 45 and 46.

The canopy 6, ring 11, conduit 9, cover 14, rim 24 and shell 18 may be of any suitable decorative substance, such for instance as aluminum, it of course being obvious that the canopy 6, cover 14, rim 24 and shell 18 may consist of spun or drawn aluminum.

Preferably the inner upwardly extending face of the shell 18 is polished to form or provided with a reflecting surface and the inner faces of the rim 24 similarly polished to form or otherwise provided with a reflecting face for the purpose now to be described. The light rays from the lamp 5 may of course be freely directed upwardly against the ceiling 1 to produce indirect light rays. In addition, the light rays, see for instance the dash and dot lines of Fig. 1, pass from the lamp 5 first to the inner face of the flange 25, then to the inner face of the intermediate portion 32 and from there onto the outer face of the shell 18.

Obviously the angle of the inner face of the flange 25 and the inner face of the intermediate portion 32 relative to the lamp 5 will depend upon the curvature or inclination of the outer face of the shell 18 in order to produce the desired lighting effect on the outer face of the shell 18.

It is of course obvious that the bulbous portion 47 of the lamp 5 may be silvered or provided with a metal cap, such as the cap 48 having an inner reflecting surface in the interest of indirect lighting without departing from the spirit of the invention.

Figure 6:
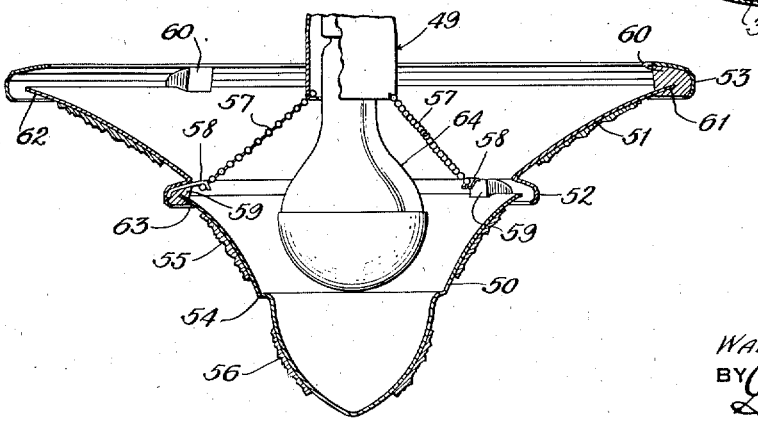
Fig. 6 is a transverse section of a second embodiment of the present invention.

In the embodiment shown in Fig. 6, the lower end of the socket covering 49 corresponding to the socket covering 14 in Fig. 1 is connected to a fixture portion having a plurality of shell members and rim portions. When two shell members, such as the shells 50 and 51 are used, the upper shell consists of an annular member having a rim 52 at its lower end to cooperate with the shell 50 and a separate rim 53 is provided to cooperate with the shell 51. The shell 50 in this embodiment is provided with one step formation 54 dividing the shell 50 into an upper annular area 55 and a lower inverted helmet shaped area 56.

In this embodiment too, there are preferably provided three ball chains 57 similar to the ball chains 28 of the embodiment illustrated in Fig. 1 connected to the lower end of the socket cover 49 by means of recesses as shown in Fig. 1 and connected to the projections or fingers 58 of the connecting devices 59, similar to the connecting devices 27, secured to the outer upper edge of the shell 50 and to the rim 52 similar to the rim discussed in the embodiment illustrated in Fig. 1.

The rim 53 on the other hand is provided with three blocks 60 having upper and outer faces conforming to the inner faces of the rim 53 and slots 61 conforming in thickness and shape to the upper outer edge portion 62 of the shell 51.

To assemble the several parts of this fixture, the rim 53 is first slipped in place adjacent the cover 49 either before or after the ball chains 57 are connected to the socket cover 49 and their connecting devices 59, then the blocks 60 slipped in place on the outer edge portion 62 of the shell 51, then the rim 53 slipped down over the blocks 60 and then the blocks 60 equally spaced from one another. On the other hand, the rim 53 may be secured to the shell 51 before slipping it up adjacent the socket cover 49. Thereupon the connecting devices 59 are grouped together and slipped on the outer edge portion 63 of the shell 50 and then the rim portion 52 slipped over the connecting devices 59 and thereupon the connecting devices 59 equally spaced from one another as explained with regard to assembling the parts illustrated in Fig. 1.

With this embodiment, it will of course appear that the angle of the inner faces of the rims 53 and 52 relative to the light rays coming from the lamp 64 will depend upon the curvature and inclination of the outer faces of the shells 51 and 50 to produce the desired lighting effect.

Figure 7:
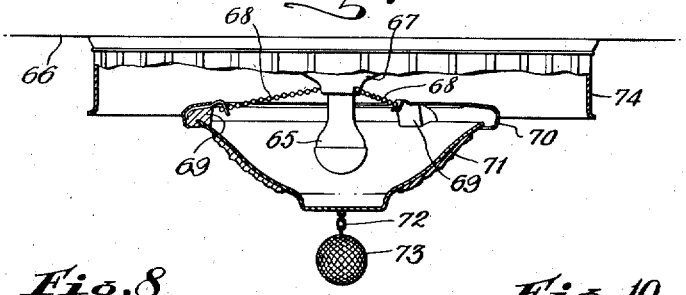
Fig. 7 is a fragmental section of a third embodiment of the present invention.

In the embodiment illustrated in Fig. 7, the lamp 65 is secured in a lamp socket disposed adjacent to the ceiling 66. The socket cover 67 is secured in place in any well known manner. To the lower end thereof, there are connected the ball chains 68 which are associated with the connecting devices 69 similar to the connecting devices 27 shown in Fig. 1, which are mounted in the rim 70 secured to the outer upper edge of the shell 71 by such connecting devices 69.

The outer face of the shell 71 has a different decorative design than that shown in Fig. 1 and has provided at its lower end a chain connection 72 to which there is in the present instance attached a decorative ball 73 composed for instance of glass or other light reflecting substance.

Preferably in the present instance, there extends from the ceiling 66 an annular shell 74 spaced from the outer edge of the rim 70 to cooperate with the rim 70 and shell 71 to form a ceiling fixture.

In the present instance, some of the light rays from the lamp 65 will of course be directed upwardly against the ceiling inside the shell 74 and also be directed against the inner face of the shell 74 preferably formed into a reflecting surface and other light rays from the lamp 65 will be directed against the inner face of the rim 70 to be reflected against the outer face or decorative surface on the outside of the shell 71 and also onto the glass ball 73.

Figure 8:
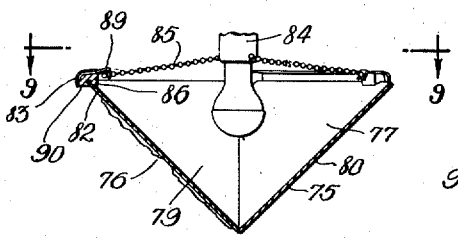
Fig. 8 is a fragmental section of a fourth embodiment of the present invention.
Figure 9:
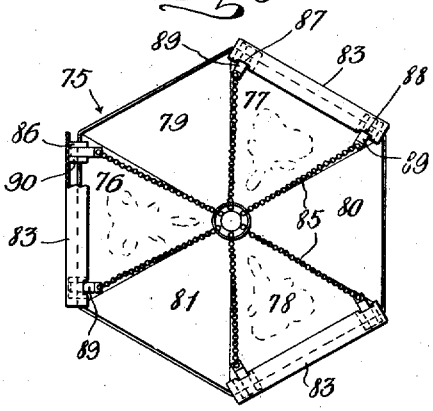
Fig. 9 is a section on the line 9—9 of Fig. 8.

In the embodiment illustrated in Figs. 8 and 9, the suspended shell 75 conforms to an inverted six-faced pyramid with alternate triangular faces 76, 77 and 78 provided with an ornamental finish and the remaining triangular faces 79, 80 and 81 either provided with an ornamental finish or plain as indicated in Fig. 9.

The upper end portions 82 of the panels 76, 77 and 78 have each attached thereto a reflecting rim 83 similar to the reflecting rim 24 of the embodiment illustrated in the embodiment of Fig. 1. These reflecting rims 83 may be separate straight pieces as indicated in Fig. 9, each separately connected to the socket cover 84 by connecting means including ball chains 85 and connecting devices 86. Each rim 83 is provided with two notches 87 and 88 near its ends to receive the fingers 89 of the connecting devices 86, which fingers 89 are similar to the fingers 42 of the embodiment illustrated in Fig. 1 and associated with blocks 90 similar to the blocks 29 of the embodiment illustrated in Fig. 1.

With this embodiment, it will of course appear that alternate faces will be illuminated in the interest of the ultimate decorative effect.

Figure 10:
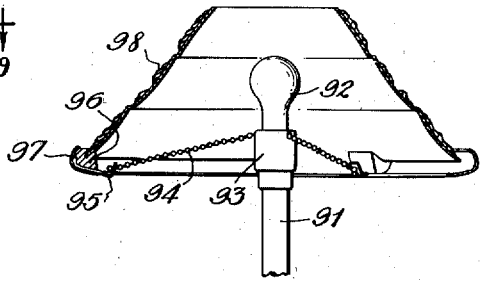
Fig. 10 is a fragmental section of a fifth embodiment of the present invention.

In the embodiment illustrated in Fig. 10, the invention is shown associated with a floor lamp in which the upright 91 has formed at its upper end a lamp socket to receive the lamp 92 with its bulbous end facing upwardly and the socket of the lamp provided with a cover 93 which is provided with slots at its upper end to receive the ends of the ball chains 94 connected to the fingers 95 of blocks 96 secured in a reflecting rim 97 formed at the lower edge of the shell 98, the shell 98 in the present instance being conical with its wide end at the bottom.

The outer face of the shell 98 in the present instance may be formed to produce a decorative effect or provided with a decorative surface as shown. Some of the light rays from the lamp 92 will of course be directed against the inner face of the shell 98 which may be provided with a reflecting surface to be directed downwardly and other light rays be directed against the inner face of the rim 97 which is provided with a reflecting surface, the angles of which rim relative to the lamp are such that the light rays will in turn be deflected onto the outer face of the shell 98 or the decorative effect on the shell 98.

The blocks 96 of the connecting devices in the present instance are inverted as compared to the embodiments heretofore described and the shape of the same consequently slightly changed.

In other respects the connecting devices 96 and ball chains 94 are practically the same as those used with the embodiment illustrated in Fig. 1.

Figure 11:
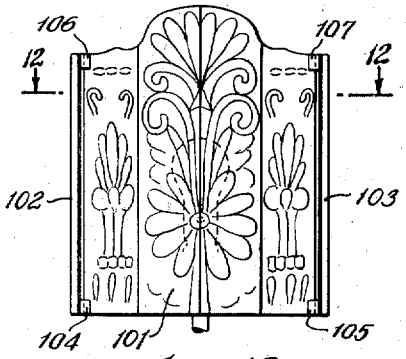
Fig. 11 is a side elevation of a sixth embodiment of the present invention.
Figure 12:
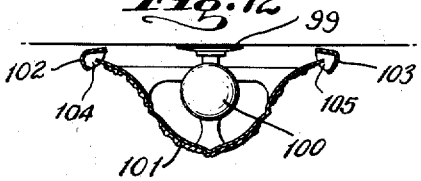
Fig. 12 is a section on the line 12—12 of Fig. 11.

In the embodiment illustrated in Figs. 11 and 12, there is shown a wall bracket 99 to which is connected a lamp 100 and a shell 101 to intercept the direct rays from the lamp 100. The outer face of the shell 101 is preferably provided with an ornamental effect either due to the configuration of the shell itself or to the ornamental matter secured thereto. Disposed along the vertical edges of the shell 101, there are provided the vertically extending rims 102 and 103 having reflecting faces to receive some of the light rays from the lamp 100 and reflect them onto the adjacent outer faces of the shell 101.

In the present instance, there are provided two blocks 104 and 105 adjacent the lower ends of the shell 101 and two blocks 106 and 107 adjacent the upper end of the shell 101 which are slotted to receive the end portions of the shell 101 and provided with outer faces conforming to the inner faces of the rims 102 and 103 to snugly fit in the rims 102 and 103 as illustrated.

It is of course obvious that the shell, as for instance the shell 18 of the embodiment illustrated in Fig. 1 may itself be constructed to present an outer ornamental configuration or else the outer face or faces of the shell 18, see for instance the outer faces of the shells 50 and 51 of the embodiment illustrated in Fig. 6 provided with ornamental devices to produce an outer ornamental effect, see also the shells of the embodiments illustrated in Figs. 7, 8, 10 and 11.

It is of course obvious that various changes and modifications may be made to the details of construction without departing from the general spirit of the invention as set forth in the appended claims.

I claim:

1. The combination of a lamp, a substantially cone shaped shell having an outer face arcuately receding from a true cone, a channel shaped reflecting rim separate and spaced from the outer edge of said shell, said rim having an inner reflecting face disposed radially inward of the outer edge of, and facing the inner face of, said shell initially to receive light rays from said lamp and having a second reflecting face disposed radially outward of the outer edge of, and facing the outer face of, said shell to receive the light rays from said first reflecting face and direct them onto the outer face of said shell, and connectors spaced from one another, lying within the channel of said rim, and mounted along the outer edge of said shell to connect said rim to said shell.

2. The combination of a lamp, a substantially cone shaped shell having an outer face arcuately receding from a true cone, a channel shaped reflecting rim separate and spaced from the outer edge of said shell, said rim having an inner reflecting face disposed radially inward of the outer edge of, and facing the inner face of, said shell initially to receive light rays from said lamp and having a second reflecting face disposed radially outward of the outer edge of, and facing the outer face of, said shell to receive the light rays from said first reflecting face and direct them onto the outer face of said shell, and connectors slidable on the outer edge of said shell to be spaced from one another and connect said rim to said shell.

3. A lighting fixture comprising a cupped shell having a free edge, a light source disposed inside of said shell, and an endless channeled light reflector separate and spaced from said free edge of the shell, said reflector having inner light reflecting surfaces, certain of said surfaces being positioned inwardly of the inner face of said shell and facing the light source to intercept direct light rays from said source and reflect them onto another of the light reflecting surfaces of said channeled reflector, said last mentioned surface being positioned outwardly of and facing the outer surface of the shell to direct a flux of converging light rays to illuminate substantially the entire outer surface of said shell.

4. A lighting fixture having a support, a closed bottom, uninterrupted cupped shell having a free edge and an apex, a light source secured to said support and disposed inside of said shell, an opaque endless channeled light reflector separate, spaced from and surrounding said free edge of the shell having inner light reflecting surfaces, certain of said surfaces being positioned inwardly of the inner face of said shell and facing the light source to intercept direct light rays from said source and reflect them onto other light reflecting surfaces of said channeled reflector, said last mentioned surfaces being positioned outwardly of and facing the outer surface of the shell to direct a flux of converging light rays to illuminate substantially the entire outer surface of said shell, and means associated with said support and said channeled reflector for supporting said reflector and shell.

5. The combination with a lamp socket, of a lamp in said socket, a socket cover extending around said socket, a shell intercepting some of the light rays extending from said lamp, a rim independent of and spaced from said shell and having an initial reflecting face extending inwardly from the outer edge of said shell to receive some of the light rays from said lamp and a second reflecting face extending beyond the outer edge of said shell to receive light rays from said first reflecting face and direct them in such a manner that a conical flux of converging light rays results and is thrown onto the outer face of said shell, connecting pieces spaced along the outer edge of said shell connecting said rim to said shell, and flexible connecting means for connecting said connecting pieces to said socket cover.

6. A lighting fixture having a closed bottom, uninterrupted cupped shell having a free edge, a conical shell having a central opening at its inner end conforming in size to the free edge of said cupped shell, a light source disposed inside of said cupped shell, and opaque endless channeled light reflectors separate and spaced from the free edge of said cupped shell and the larger outer edge of said conical shell, said reflectors having inner light reflecting surfaces, certain of said surfaces being positioned inwardly of the inner faces of said shells respectively and facing the light source to intercept direct light rays from said source and reflect them onto other light reflecting surfaces of said channeled reflectors, said last mentioned surfaces being positioned outwardly of and facing the outer surfaces of said shells respectively to direct fluxes of converging light rays to illuminate the outer surfaces of said shells.

7. A lighting fixture having a cupped shell having a free edge and including an annular shoulder concentric to the center of said shell, facing outwardly and spaced from said free edge, a light source disposed inside of said shell, and channeled light reflecting means separate and spaced from said free edge of the shell, said reflecting means having inner light reflecting surfaces, certain of said surfaces being positioned inwardly of the inner face of said shell and facing the light source to intercept direct light rays from said source and reflect them onto other of the light reflecting surfaces of said channeled reflecting means, said last mentioned surface being positioned outwardly of and facing the outer surface of the shell to direct a flux of converging light rays to illuminate substantially the entire outer surface of said shell and particularly said annular shoulder to produce an illuminated outer surface with a highly illuminated annular light band.

8. A lighting fixture having a cupped shell having a free edge and including a plurality of annular shoulders concentric to the center of said shell, facing outwardly and spaced from one another at predetermined intervals in said shell, a light source disposed inside of said shell, and channeled light reflecting means separate and spaced from said free edge of the shell, said reflecting means having inner light reflecting surfaces, certain of said surfaces being positioned inwardly of the inner face of said shell and facing the light source to intercept direct light rays from said source and reflect them onto other of the light reflecting surfaces of said channeled reflecting means, said last mentioned surface being positioned outwardly of and facing the outer surface of the shell to direct a flux of converging light rays to illuminate substantially the entire outer surface of said shell and particularly said annular shoulders to produce an illuminated outer surface with a plurality of successive highly illuminated annular light bands.

9. The combination of a lamp, a substantially cone shaped shell having an outer face arcuately receding from a true cone with an opening at its center, a channel shaped reflecting rim separate and spaced from the outer edge of said shell, said rim having an inner reflecting face disposed radially inward of the outer edge of, and facing the inner face of, said shell initially to receive light rays from said lamp and having a second reflecting face disposed radially outwardly of the outer edge of, and facing the outer face of, said shell to receive the light rays from said first reflecting face and direct them onto the outer face of said shell, and connectors spaced from one another, lying within the channel of said rim, and mounted along the outer edge of said shell to connect said rim to said shell.

10. A lighting fixture having a cupped shell, having a free edge and a decorative face having portions thereof in relief and facing outwardly, a light source disposed inside of said shell, and channeled light reflecting means separate and spaced from said free edge of the shell, said reflecting means having inner light reflecting surfaces, certain of said surfaces being positioned inwardly of the inner face of said shell and facing the light source to intercept direct light rays from said source and reflect them onto other of the light reflecting surfaces of said channeled reflecting means, said last mentioned surface being positioned outwardly of and facing the outer surface of the shell to direct a flux of converging light rays to illuminate substantially the entire outer surface of said shell and particularly said outwardly facing portions in relief to produce an illuminated outer surface with highly illuminated decorative ornamental motifs.

11. A lighting fixture which comprises a lamp, a reflector surrounding the lower part of the lamp adapted to reflect outward and upward light initially radiated downward from the light source of the lamp, a glare shield extending outwardly from said reflector and an internal reflecting ring surrounding the outer edge of said shield adapted to reflect light from above said shield onto the lower surface thereof.

12. A lighting fixture as defined in claim 11, in which the reflector extends below the light source and the glare shield is an annular member surrounding said reflector and concave on its under side.

13. A lighting fixture as defined in claim 11, in which the reflector is separate from the glare shield and is carried by the lamp and the glare shield is annular with a central opening.

14. The combination with a lamp socket, of a lamp in said socket, a socket cover extending around said socket, a shell intercepting some of the light rays extending from said lamp, a rim independent of and spaced from said shell and having an initial reflecting face extending inwardly from the outer edge of said shell to receive some of the light rays from said lamp and a second reflecting face extending beyond the outer edge of said shell to receive light rays from said first reflecting face and direct them onto the outer face of said shell, and connecting means for connecting said rim and shell to said socket cover.

15. A lighting fixture comprising a lamp, a reflector surrounding the lower part of the lamp adapted to reflect outward and upward light initially radiated downward from the light source of the lamp, a glare shield extending outwardly from said reflector, said shield having a free edge and being arranged so that the upper surface thereof intercepts light rays from said lamp, a reflecting ring surrounding the free edge of said shield and being spaced therefrom, said ring being channel-shaped and having internal light reflecting surfaces arranged to intercept above said shield outwardly directed light rays from said lamp and to reflect such rays convergingly downward onto the under surface of said shield so that the light rays circuited about said free edge of the shield illuminate substantially the entire under surface of said shield.

WALTER W. KANTACK.